US 11,550,628 B2

(12) United States Patent
Eschinger et al.

(10) Patent No.: US 11,550,628 B2
(45) Date of Patent: Jan. 10, 2023

(54) PERFORMING RUNBOOK OPERATIONS FOR AN APPLICATION BASED ON A RUNBOOK DEFINITION

(71) Applicant: MASTERCARD INTERNATIONAL INCORPORATED, Purchase, NY (US)

(72) Inventors: Ryan Eschinger, Brooklyn, NY (US); Fabio Giannetti, Los Gatos, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 210 days.

(21) Appl. No.: 16/719,328

(22) Filed: Dec. 18, 2019

(65) Prior Publication Data

US 2021/0191769 A1 Jun. 24, 2021

(51) Int. Cl.
*G06F 9/48* (2006.01)
*G06F 9/455* (2018.01)
*G06F 8/65* (2018.01)
*G06F 11/14* (2006.01)

(52) U.S. Cl.
CPC ............. *G06F 9/4887* (2013.01); *G06F 8/65* (2013.01); *G06F 9/45558* (2013.01); *G06F 11/1461* (2013.01); *G06F 11/1464* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 10,282,248 | B1 * | 5/2019 | Gudka | G06F 11/0787 |
|---|---|---|---|---|
| 2015/0186181 | A1 * | 7/2015 | Gleyzer | G06F 9/5027 718/102 |
| 2019/0294994 | A1 * | 9/2019 | Grossman | G06F 9/453 |
| 2019/0303208 | A1 * | 10/2019 | Koya | G06F 9/5038 |
| 2019/0391834 | A1 * | 12/2019 | Mullen | G06F 9/455 |
| 2019/0391844 | A1 * | 12/2019 | Chen | G06F 9/5072 |
| 2019/0394219 | A1 * | 12/2019 | Huang | H04L 63/1425 |

* cited by examiner

*Primary Examiner* — Wynuel S Aquino

(57) ABSTRACT

The disclosure herein describes automating runbook operations associated with an application within an application host on an application platform. A runbook definition associated with the application is accessed by a processor, wherein the runbook definition includes trigger events and runbook operations associated with the trigger events. A runbook operator is executed on the application platform based on the accessed runbook definition and a runbook sidecar container is added to the application host by the runbook operator, wherein the runbook operator is enabled to perform the runbook operations within the application host via the runbook sidecar container. Based on detecting a trigger event, a runbook operation associated with the detected trigger event is performed by the runbook operator, via the runbook sidecar container, whereby the application is maintained based on performance of the runbook operations from within the application host.

20 Claims, 6 Drawing Sheets

PERFORMING RUNBOOK OPERATIONS FOR AN APPLICATION BASED ON A RUNBOOK DEFINITION

BACKGROUND

Traditionally, teams that develop applications also write runbooks to capture commands that are necessary to run, maintain, and/or troubleshoot the applications while the applications are in use. These runbooks serve as references for human operators to intervene in the execution of the application as necessary to restore it to a healthy status. While such tasks are vital for maintaining the general health of complex computing systems, the use of runbooks to run tasks manually results in operators performing relatively simple, repetitive actions, which is often an inefficient use of operators' time and effort. Further, manual performance of runbook operations by human operators runs the risk of introducing human error into the maintenance of the computing systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for automating runbook operations associated with an application within an application host on an application platform is described. A runbook definition associated with the application is accessed by a processor, wherein the runbook definition includes at least one trigger event and at least one runbook operation associated with the at least one trigger event. A runbook operator is executed on the application platform based on the accessed runbook definition and a runbook sidecar container is added to the application host by the runbook operator, wherein the runbook operator is enabled to perform the at least one runbook operation within the application host via the runbook sidecar container. Based on detecting a trigger event of the at least one trigger event, a runbook operation associated with the detected trigger event is performed by the runbook operator, via the runbook sidecar container, whereby the application is maintained based on performance of the runbook operation.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for automating runbook operations associated with an application within an application host on an application platform. A runbook definition associated with the application is accessed by a processor. The runbook definition includes trigger events and runbook operations associated with the trigger events. A runbook operator is executed on the application platform based on the accessed runbook definition and a runbook sidecar container is added to the application host where the application is deployed. The runbook sidecar container enables the runbook operator to perform the runbook operations within the application host via the runbook sidecar container. Based on detecting a trigger event, a runbook operation associated with the detected trigger event is performed by the runbook operator, via the runbook sidecar container, such that the application is maintained in a healthy condition.

The disclosure addresses the challenges of automating the performance of runbook operations that are provided in a runbook by developers of an application. For example, the described systems and methods address the challenges of automatically performing such runbook operations for applications that may be deployed on an application host or hosts in various ways throughout an application platform. The disclosure operates in an unconventional way at least by enabling users to generate runbook definitions with customized runbook operations and associated trigger events in a flexible format that is platform-agnostic. Further, the disclosure provides for the execution of runbook operator applications that evaluate the runbook definitions and deploy runbook operation sidecar containers on to the application hosts of the associated applications, such that the runbook operations are efficiently performed locally to the application hosts based the detection of a wide variety of possible trigger events. This disclosure significantly reduces or even eliminates the need for human operators to perform repetitive runbook operations to maintain the state of computing systems and, as a result, also reduces the exposure of the system to the possible human error that accompanies such manual operations.

Figure 1:
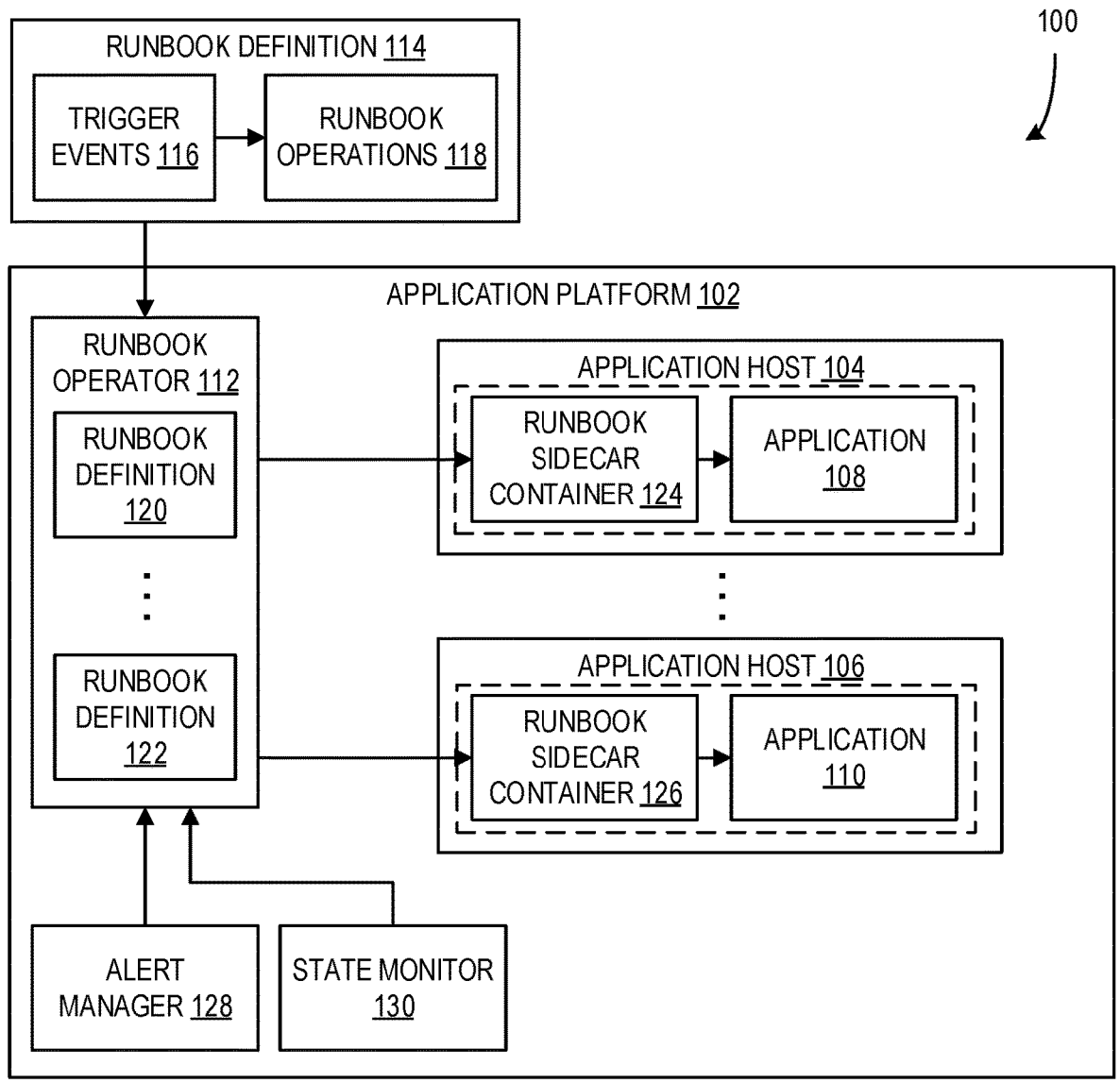
FIG. 1 is a block diagram illustrating a system configured for automating runbook operations for applications on an application platform according to an embodiment.

FIG. 1 is a block diagram illustrating a system 100 configured for automating runbook operations for applications 108-110 on an application platform 102 according to an embodiment. The application platform 102 includes hardware, firmware, and/or software configured to host and/or execute computer applications, perform data processing operations, and/or store data associated therewith. The application platform 102 is further configured to host and/or execute application hosts 104-106, a runbook operator 112, alert manager 128, and state monitor 130. In some examples, the application platform 102 includes a plurality of computing devices that are configured to communicated and/or otherwise interact with each other to perform the operations described herein. The plurality of computing devices may be arranged in a distributed manner, such that the computing devices are configured to communicate over network connections via a network. In alternative examples, the application platform 102 and the components thereof are hosted and/or executed on a single computing device. It should be understood that the system 100 may be configured according to other organizations or arrangements of physical computing devices and/or other associated components as would be understood by a person of ordinary skill in the art without departing from the description herein.

The application platform 102 is configured to create, maintain, and/or delete application hosts 104-106 dynamically based on instructions received from users and/or other programs or applications associated with the application platform 102. While two application hosts 104-106 are illustrated, it should be understood that, in other examples, more, fewer, or different application hosts may be present on the application platform 102 without departing from the description herein. In some examples, the application platform 102 is configured as a virtualization platform, container-based platform (e.g., KUBERNETES platform), or other type of platform enabling dynamic deployment, scaling, and operations of applications and/or services across a cluster of computing devices.

The application hosts 104-106 include hardware, firmware, and/or software configured for hosting applications 108-110 and enabling the creation and use of the runbook sidecar containers 124-126 as described herein. The application hosts 104-106 are configured as logically separate entities for hosting and executing applications associated therewith. For instance, from the perspective of the application 108, application host 104 behaves as a stand-alone computing entity configured to perform operations and/or store data associated with the application 108, the runbook sidecar container 124, and any other applications hosted on the application host 104. In some examples, the application hosts 104-106 are configured as virtual machines (VMs) or other virtual computing instances (VCIs) on a virtualized platform and/or as hosts of containerized applications and/or other containerized software on a container-based platform (e.g., pods in a KUBERNETES platform).

The applications 108-110 on the application hosts 104-106 are configured as software applications that may include programs and/or services for data processing, storage, communications, and/or other types of applications as would be understood by a person of ordinary skill in the art. While one application is illustrated in each application host 104-106, it should be understood that more or different applications may be hosted on each application hosts 104-106 without departing from the description herein.

In some examples, each application 108-110 is associated with a runbook definition (e.g., runbook definition 114, 120-122). Runbooks typically include a compilation of routine procedures and operations that are associated with an application. Such routines or operations may be configured to begin, stop, manage, maintain, and/or debug the associated application. Runbook definitions, as described herein, include trigger events 116 that are mapped to runbook operations 118, wherein the runbook operations 118 include the routines or operations that are present in the runbook of the application, as would be understood by a person of ordinary skill in the art. Further data and/or metadata associated with the runbook definition and/or the associated application may be included in the runbook definition, such as a name or identifier of the application. Each trigger event 116 in a runbook definition 114 is mapped to at least one runbook operation 118, such that, when the trigger event 116 occurs and/or is detected, the mapped runbook operation or operations 118 are performed automatically. In some examples, trigger events 116 include scheduled events based on scheduled times for performance of operations 118, alert-based events that trigger performance of operations 118 based on detection of alerts, and/or system metric-based events that trigger performance operations based on detection of metrics that have gone outside of defined metric threshold ranges. Further, runbook operations 118 include executable commands, code, and/or instructions that are processed and/or performed upon the triggering of the trigger events 116 associated with the runbook operations 118. Additionally, runbook definitions 114, 120-122 may include electronic documents and/or files formatted according to a standardized runbook definition format, which is described in greater detail below. Use of such a format ensures that the runbook definitions can be accurately interpreted by the runbook operator 112 as described herein.

The runbook operator 112 of the application platform 102 includes hardware, firmware, and/or software configured for accessing, storing, and/or interpreting runbook definitions 120-122 associated with the hosted applications 108-110 on the application platform 102. Further, the runbook operator 112 is configured to add or otherwise incorporate runbook sidecar containers 124-126 on the application hosts 104-106 respectively and to perform runbook operations 118 of the runbook definitions 120-122 on the applications 108-110 via the associated runbook sidecar containers 124-126. In some examples, each runbook sidecar container 124-126 is colocated and deployed with the associated application instance, as illustrated by the dashed box in FIG. 1. In such an example, if there are five different applications running on the same application host, there are also five separate runbook sidecar containers running, one for each application.

In some examples, the runbook operator 112 is configured to access or receive the runbook definition 114 and store it as a runbook definition 120-122 as illustrated. The runbook operator 112 is further configured to identify an application associated with each runbook definition 120-122 (e.g., by identifying an application name within the runbook definition), find the identified application within the application platform 102, and deploy a runbook sidecar container (e.g., runbook sidecar containers 124-126) to the host or hosts upon which the identified application is deployed.

Additionally, the runbook operator 112 evaluates the trigger events 116 of each runbook definition 120-122 while the associated applications 108-110 are hosted on the application platform 102. Based on an evaluation indicating that a trigger event 116 has occurred, the runbook operator 112 performs the runbook operation or operations 118 associated with the trigger event 116. Such a performance may include the runbook operator 112 executing instructions of the runbook operation(s) 118 and/or communicating such instructions to the runbook sidecar container 124-126 associated with the runbook definition such that the communicated instructions are performed via the runbook sidecar container locally on the associated application host.

In some examples, evaluation of the trigger events 116 by the runbook operator 112 is based on data received by the runbook operator 112 from the alert manager 128 and/or the state monitor 130. The alert manager 128 includes hardware, firmware, and/or software configured to detect or otherwise obtain errors, exceptions, or other alerts that may be sent by or otherwise occur in association with application hosts, applications, or other components (e.g., hardware-based alerts, kernel-level alerts) of the application platform 102. The alert manager 128 is further configured to store the obtained alerts and provide access (e.g., via an application program interface (API)) to the obtained alerts to the runbook operator 112 and/or other components of the system 100. In some examples, the runbook operator 112 is configured to periodically poll the alert manager 128 to determine if any alerts have been obtained that are relevant to the evaluation of the trigger events 116 of the runbook definitions 120-122. Alternatively, or additionally, the runbook operator 112 subscribes to the relevant alerts on the alert manager 128 such that the alert manager sends notifications to the runbook operator 112 when those alerts to which the runbook operator 112 is subscribed are obtained by the alert manager.

Further, it should be understood that, while the system 100 includes one runbook operator 112 on the application platform 102, in other examples, an application platform includes more or different runbook operators, each of which may include more, fewer, or different runbook definitions.

The state monitor 130 includes hardware, firmware, and/or software configured to monitor the state of the application platform 102 and its associated application hosts 104-106, applications 108-110, and/or other components thereof. Such monitoring includes tracking a variety of different metrics associated with the performance of the application platform 102 and storing data values associated with those metrics. As with the alert manager 128, the state monitor 130 may be configured to enable access to the metric data values by the runbook operator 112 via an API or other type of interface. The runbook operator 112 may request relevant metric data periodically and/or subscribe to receive notifications regarding metric data value changes as described above with respect to the alert manager 128.

It should be understood that, while the alert manager 128 and state monitor 130 are illustrated as two separate entities, in other examples, more, fewer, or different components of the application platform 102 may be configured to perform the operations of the alert manager 128 and/or the state monitor 130 without departing from the description herein. For instance, in some examples, the runbook sidecar containers 124-126 are configured to obtain alerts and/or metric data values associated with the applications 108-110 and/or the associated application hosts 104-106 and send such obtained data to the runbook operator 112 for use in evaluating trigger events 116. Still other examples may be configured and/or organized to provide alerts and/or metric data values to the runbook operator 112 in other ways as would be understood by a person of ordinary skill in the art without departing from the description herein.

Upon receiving alerts and/or metric data values from the alert manager 128 and/or the state monitor 130, the runbook operator 112 is configured to compare the received alerts and/or metric data values to the trigger events 116 of the runbook definitions 120-122, as mentioned above. In the case of received alerts, a trigger event 116 associated with a particular alert may cause the associated runbook operation 118 to be triggered based on the presence of the alert in the set of alerts received by the runbook operator 112. Alternatively, or additionally, alert-based trigger events may be configured to trigger the associated operations based on one or more defined alert thresholds. For instance, an alert threshold may be configured to require the associated alert to be received a define number of times within a time period, or at a defined rate. Further, an alert-based trigger event may be defined to be triggered upon receipt of a combination of different alerts within a time period. In some examples, alert-based trigger events and associated runbook operations include receiving an error-based alert from an application and performing a runbook operation for diagnosing the problem, correcting the problem, and/or resetting or restarting the application.

For instance, an alert-based trigger event may be defined to trigger when a persistent volume associated with the application reaches a capacity threshold (e.g., 75% of maximum capacity). Such a trigger event may be based on the following formula.

(100*volume_stats_available_bytes{ }/volume_stats_capacity_bytes{ })<25

Further, in this example, the operator is configured to use the sidecar to create space (e.g., delete some temporary files) and/or to issue a command to increase the size of the volume (e.g., from 10 GB to 15 GB). Example KUBERNETES volume definitions are provided below. When the trigger event is triggered, the operator issues a command to resize the volume by editing the volume definition from Example 1 to Example 2 (e.g., the issued command includes "kubectl edit pvc example").

```
Example 1:
kind: PersistentVolumeClaim
metadata:
    name: example
    namespace: my-namespace
spec:
    accessModes:
    - ReadWriteMany
    resources:
        requests:
            storage: 10Gi
    storageClassName: a-storage-class
    volumeName: pvc-name
Example 2:
kind: PersistentVolumeClaim
metadata:
    name: example
    namespace: my-namespace
spec:
    accessModes:
    - ReadWriteMany
    resources:
        requests:
            storage: 15Gi
    storageClassName: a-storage-class
    volumeName: pvc-name
```

After editing the volume definition to include a storage capacity of 15 GB, the applications on the application host may be restarted and, upon being restarted, they will have increased capacity volumes.

In another example, an application is configured to process messages from a queue. The state monitor 130 is configured to detect when the application has not processed messages for a defined period of time when there are unprocessed messages in the queue and issue an associated alert upon detection. That issued alert triggers the runbook operator to issue a command that kills or otherwise stops the application, which appears to be stalled, and causes the platform to schedule or otherwise instantiate a replacement application.

Based on received metric data values from the state monitor 130, the runbook operator 112 compares the received data metric values to metric-based trigger events 116 to determine whether to perform associated runbook operations 118. In some examples, metric-based trigger events include defined metric data value thresholds and/or threshold ranges to which the received metric data values are compared. For instance, a received metric data value indicates a rate of service requests (e.g., 100 requests/second)

made to the application 108 over a previous time period and a trigger event associated with the application 108 includes a service request rate threshold (e.g., 90 requests/second), such that, when the received metric data value exceeds the threshold, the associated runbook operation 118 is triggered and performed. In this case, the performed runbook operation 118 may include creating a new instance of the application to handle increased service requests. Alternatively, or additionally, metric-based trigger events may include ranges of metric data values, such that when received data values are outside of the range, the associated operation is triggered and performed. In still other examples, trigger events include ranges that cause the associated operation to be performed when received metric data values fall inside of the range.

In an example similar to the above example associated with the application configured for processing messages in a queue, the state monitor 130 detects that a backlog metric in the message queue exceeds a defined backlog threshold, which triggers the performance of a runbook operation that launches more instances of the application to handle the load.

In addition to alert-based trigger events and metric-based trigger events, in some examples, the trigger events 116 of a runbook definition include time-based or schedule-based events. Such events are defined to trigger the associated runbook operations 118 upon the passing or expiration of a define time limit or time period. For instance, a trigger event 116 may be defined to cause the associated runbook operation 118 to be performed once every week. Alternatively, or additionally, schedule-based events may be defined to cause operations to be performed as one-time events or repeated events on specific dates and/or at specific times.

In further examples, trigger events 116 include events that are combined or complex, requiring multiple events and/or multiple event types to occur to trigger the associated runbook operations 118. For instance, a trigger event 116 may include a schedule-based aspect (e.g., the trigger event is to be evaluated once a day) and a metric-based aspect (e.g., metric data values received over the past day are compared to a defined threshold). Alternatively, or additionally, a trigger event 116 may include a metric data value evaluation that is performed only when a particular alert is detected from the associated application (e.g., if a received metric data value indicates poor performance of the application platform 102 as a whole and an alert from the specific application was received that indicates frequent failures in responding to service requests, certain maintenance-based runbook operations are triggered for the application).

Figure 2:
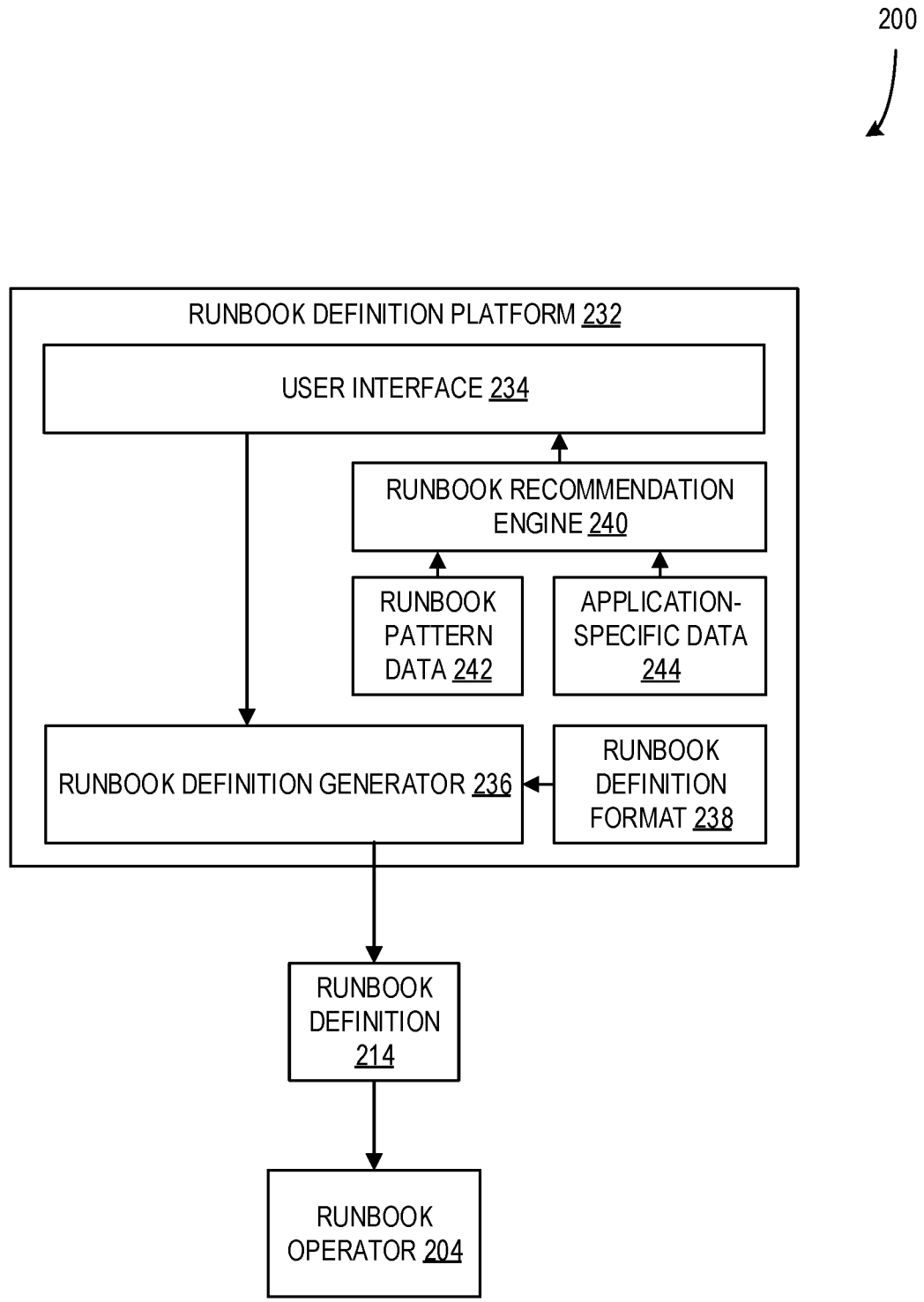
FIG. 2 is a block diagram illustrating a system configured for generating a runbook definition according to an embodiment.

FIG. 2 is a block diagram illustrating a system 200 configured for generating a runbook definition 214 according to an embodiment. The system 200 includes a runbook definition platform 232, which includes a user interface 234 configured to obtain runbook information from a user and a runbook definition generator 236 configured to generate a runbook definition 214 based on the obtained runbook information and a runbook definition format 238 as described herein. Further, the runbook definition platform 232 includes a runbook recommendation engine 240 that is configured to provide recommended trigger events and/or recommended runbook operations to a user via the user interface 234 based on runbook pattern data 242 and application-specific data 244. In some examples, the runbook definition 214 generated by the runbook definition platform 232 as described herein is provided to a runbook operator 204, where it is used to automate the performance of runbook operations for an associated application on an application platform as described above with respect to FIG. 1.

The runbook definition platform 232 includes hardware, firmware, and/or software configured to interact with a user via the user interface 234 and generate a runbook definition 214 as described herein. It should be understood that the runbook definition platform 232 may include one or more computing devices, data stores, and/or other computing components organized and/or arranged in a manner understood by a person of ordinary skill in the art without departing from the description herein. In some examples, the runbook definition platform 232 is located on and executed on a single computing device of a user, such as a laptop or desktop computer. In alternative examples, some or all of the runbook definition platform 232 is distributed across a network of multiple computing devices, such that a user accesses the platform 232 via a web service or the like.

The user interface 234 includes hardware, firmware, and/or software configured to communicate with a user as described herein. In some examples, the user interface 234 includes a graphical user interface (GUI), though in other examples, other types of interfaces (e.g., a command line interface (CLI)) may also be used without departing from the description. The user interface 234 is configured to enable a user to provide information to be included in the runbook definition to be generated, such as the name or other identifier of the associated application, information about trigger events (e.g., event types, specific event identifiers, threshold and/or schedule information), and information about runbook operations to be linked to the trigger events (e.g., command line code, script calls, other instructions to be executed, and/or operation description information). In some examples, GUI components of the user interface 234 are provided, such as text entry boxes, dropdown boxes, selection lists, or the like, to enable a user to efficiently enter the runbook definition information.

Further, the user interface 234 is configured to display, communicate, or otherwise provide information about the runbook definition generation process to the user. In some examples, the user interface 234 is configured to prompt a user to enter certain types of information via highlighted GUI components, dialog boxes, or the like. Additionally, the user interface 234 may be configured to display or otherwise provide recommendations regarding potential trigger events and/or runbook operations to include in the runbook definition to be generated. An example of a GUI of user interface 234 is described below with respect to FIG. 5.

The runbook definition generator 236 includes hardware, firmware, and/or software configured to receive information provided by the user via the user interface 234 and generate a runbook definition based on the received information. The generated runbook definition 214 is further based on the runbook definition format 238, which is a standardized format that ensures that runbook operators are able to accurate interpret the generated runbook definition. In some examples, the information provided by the user includes an application identifier or name, data associated with at least one trigger event and data associated with a runbook operation to be performed based on detection of the trigger event.

In some examples, the runbook format 238 defines a format for a document or file that is interpretable by runbook operators. An example of such a format is provided below.

```
name: <Runbook Name>
app: <Application Identifier>
schedule: <Optional Schedule Defintion>
triggers:
    - alert:
        name: <Alert Name>
        source: Alert Manager
        action: <Runbook Operation Name>
    - metric:
        name: <Metric Name>
        source: State Monitor
        query: <Metric Query>
        action: <Runbook Operation Name>
actions:
    - action:
        name: <Runbook Operation Name>
        type: command
        command: <Operation Commands/Code>
        on_failure:
            url: <Endpoint URL>
            headers: <http headers (e.g. bearer token)>
            payload: <request payload if any>
        on_success:
            url: <Endpoint URL>
            headers: <http headers (e.g. bearer token)>
            payload: <request payload if any>
    - action:
        name: <Runbook Operation Name>
        type: webhook
        url: <Endpoint URL>
        headers: <http headers (e.g. bearer token)>
        payload: <request payload if any>
        on_failure:
            url: <Endpoint URL>
            headers: <http headers (e.g. bearer token)>
            payload: <request payload if any>
        on_success:
            url: <Endpoint URL>
            headers: <http headers (e.g. bearer token)>
            payload: <request payload if any>
    - action:
        name: <Runbook Operation Name>
        type: kube
        verb: <create | delete | apply | patch>
        manifest: <Manifest URL>
        on_failure:
            url: <Endpoint URL>
            headers: <http headers (e.g. bearer token)>
            payload: <request payload if any>
        on_success:
            url : <Endpoint URL>
            headers: <http headers (e.g. bearer token)>
            payload: <request payload if any>
```

In the above example runbook definition format, the runbook information is divided into several sections. First, the metadata at the top of the definition includes the name of the runbook and the application identifier, which enables the runbook operator to determine the application with which the runbook definition is associated. In some examples, a runbook definition may be associated with more than one application, and this field would then include an identifier for each associated application.

Next, there is a "schedule" section where a schedule for evaluating the runbook may be defined. For instance, a schedule for runbook evaluation may be defined in this section as a "cron job" time sequence (e.g., "* * * * * /5"). Other conventions may also be used without departing from the description herein. In further examples, schedules for specific trigger event-runbook operation pairs are defined in this section as described above.

The "triggers" section includes data entries for identifying and evaluating trigger events. Further, each listed trigger event includes the name or identifier of the runbook operation or operations to be performed in the event of the trigger event occurring. As shown in the example, trigger events are defined with names and types (e.g., "alert" type or "metric" type). Further, trigger events include sources, which are Alert Manager and State Monitor components respectively. In other examples, trigger events may have other sources, such as alerts sent by application specifically. Each trigger event includes an "action" field where an identifier of the runbook operation to be performed is listed. Further, the metric-type trigger events may include a "query" field in which the threshold or range for evaluating the trigger event is defined (e.g., "query: memory_usage>0.80").

The "actions" section includes data entries for each of the runbook operations of the runbook definition. Each action, or runbook operation, has a name that identifies the runbook operation. The name of the action is used in the trigger section above to refer to associated runbook operations, mapping a trigger event in the trigger section to a runbook operation in the action section. Each action includes a "type" field for classifying the type of action. Example types shown include a "command" type, a "webhook" type, and a "kube" type, though other types may be used in other examples without departing from the description herein. Additionally, each action includes "on_failure" and "on_success" fields that are used by the runbook operator as instructions to perform on failure of the runbook operation or on success of the runbook operation respectively. In this example, the instructions therein include endpoint uniform resource locators (URLs), headers, and payloads that the runbook operator uses to record the result of the runbook operation, but other types of instructions may be included in these sections without departing from the description herein.

Further, actions in the "actions" may include type-specific fields. For instance, in the command-type action, a command field is provided. In this field, the commands, code, script calls, function calls, or the like are listed, providing the runbook operator with instructions to perform. Alternatively, in the webhook-type action, URL, header, and payload fields are included, providing the runbook operator the necessary information for performing the runbook operation using a webhook-based protocol. Further, in the kube-type action (e.g., an operation associated with the KUBERNETES platform), a verb field and a manifest URL field are included, enabling the runbook operator to perform the associated runbook operation in a manner that is compatible with the KUBERNETES platform.

The runbook recommendation engine 240 includes hardware, firmware, and/or software configured to analyze data, such as the runbook pattern data 242 and the application-specific data 244, and generate recommended trigger events and/or runbook operations for display on the user interface 234 and/or inclusion in the generated runbook definition 214. The runbook pattern data 242 includes data from other runbook definitions that have previously been generated by the runbook definition generator 236 or that have been provided to the runbook definition platform 232 (e.g., a set of runbook definitions from a runbook operator on a particular application platform may be provided to the platform 232 for use in generating recommendations for the generation of runbook definitions to be associated with that application platform). In some examples, runbook pattern data 242 includes data indicating frequently used trigger events, frequently used runbook operations, frequently used trigger event-runbook operation pairs, and/or frequently used patterns within trigger event sections and/or runbook operation sections (e.g., common "on_failure" and/or "on_success" sections may be recommended for consideration if they include application platform logging instructions or the like). Further, the application-specific data 244 includes data associated with the application for which the runbook definition is being generated, such as the types of alerts, errors, exceptions, or other events that are generated by the application, performance metrics that affect the application, load or usage patterns based on time of day, etc. The application-specific data 244 may be used by the runbook recommendation engine 240 to identify patterns of frequent errors, patterns of heavy use, or the like and use the identified patterns in generating recommendations as described.

Patterns identified in the runbook pattern data 242 and application-specific data 244 may be provided to a user via the user interface 234 as recommended trigger events and/or recommended runbook operations for use while the user inputs information as described above. While aspects of each runbook definition are specific to the particular application, the recommended trigger events and runbook operations may provide for efficient implementation of common trigger event handling and/or portions of the recommended events and/or operations may provide starting points and/or guidance for users in defining specific portions of the runbook definition to be generated.

In some examples, the user interface 234 is configured to prompt a user with recommendations generated by the runbook recommendation engine 240 as the user is providing information for the runbook definition. The prompting may include, for instance, providing a selectable list of recommendations, automatically filling fields of a form on the user interface 234 based on the recommendations provided, and/or providing "stubs" of portions of a runbook definition that are accurate with respect to the runbook definition format 238 such that common information is provided and the user is enabled to efficiently include any specific information to complete the provided sections. It should be understood that other techniques of providing recommendations to users with respect to trigger events and/or runbook operations may be used without departing from the description herein.

Figure 3:
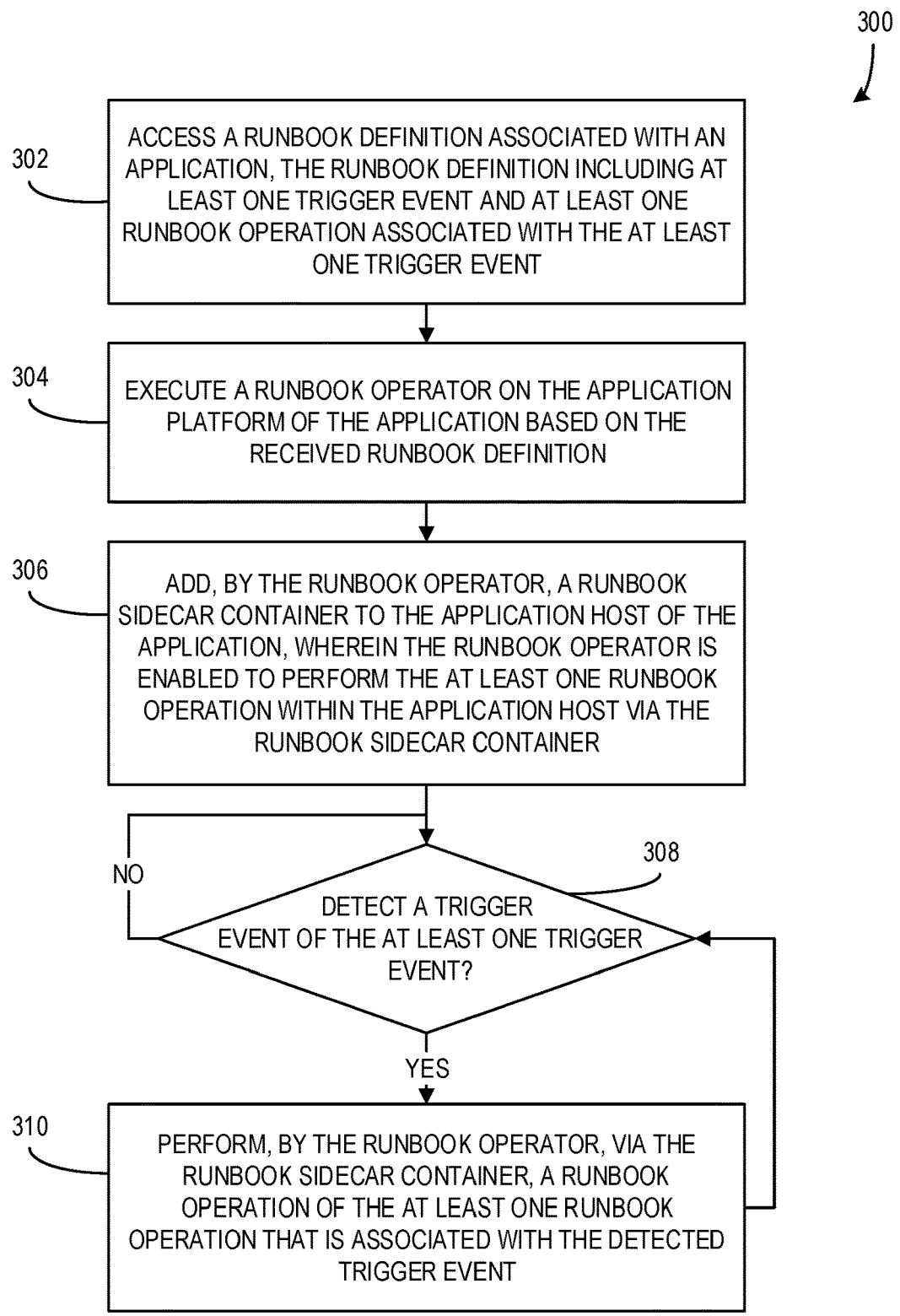
FIG. 3 is a flow chart illustrating a method of automatically performing runbook operations for an application based on runbook definitions according to an embodiment.

FIG. 3 is a flow chart illustrating a method 300 of automatically performing runbook operations for an application based on runbook definitions according to an embodiment. In some examples, the process of method 300 is performed by an application platform as described with respect to FIG. 1 and/or components thereof, such as runbook operator 112. At 302, a runbook definition (e.g., runbook definitions 114, 120-122) associated with an application (e.g., applications 108-110) is accessed. The accessed runbook definition includes at least one trigger event (e.g., trigger events 116) and at least one runbook operation (e.g., runbook operations 118) associated with the at least one trigger event. In some examples, accessing the runbook definition includes receiving a generated runbook definition from a runbook definition platform (e.g., runbook definition platform 232) as described above with respect to FIG. 2. Alternatively, or additionally, the runbook definition may be accessed from a data store configured to store the runbook definition for use by runbook operators on applications platforms.

At 304, a runbook operator is executed on the application platform on which the application is located. The runbook operator is executed based on the accessed runbook definition, such that the runbook operator is configured to evaluate the trigger events of the runbook definition and perform the runbook operations associated with the trigger events when indicated by that evaluation, as described herein. While the method 300 shows that the runbook operator is executed after the runbook definition, it should be understood that, in other examples, the runbook operator may be deployed and/or executed first and the accessed runbook definition provided to the runbook operator after the execution begins. In further examples, execution of the runbook operator includes communicating with other components of the application platform, such as an alert manager and/or a state monitor, as described herein, in order to enable efficient evaluation of the trigger events of the runbook definition and accurate performance of the runbook operations associated therewith.

At 306, the runbook operator adds a runbook sidecar container to the application host of the application, wherein the runbook operator is enabled to perform the runbook operations of the runbook definition within the application host via the runbook sidecar container. In some examples, the runbook sidecar container acts as a supporting application, or "sidecar" application, to the application with which the runbook definition is associated. The runbook sidecar container communicates with the application via any interfaces (e.g., APIs) of the application to enable the performance of the runbook operations as described herein. Additionally, the runbook sidecar container may communicate with the application for other purposes, such as collecting metrics that are specific to the application and/or detecting errors, exceptions, or alerts from the application specifically. Because the runbook sidecar container is added to the same application host as the application, it is enabled to operate from the same computing environment or instance as the application, which may provide the runbook sidecar container more efficient or more complete access to the application and/or components of the application host environment than the runbook operator alone. Further, the runbook sidecar container is configured to communicate with the runbook operator (e.g., via exposed APIs) during the process. In some examples, the communications include receiving instructions from the runbook operator and/or providing data about the application, such as state data, metric data, and/or alert data, to the runbook operator.

When the runbook operator is running and has added the runbook sidecar container to the application host, the runbook operator is configured to detect trigger events that are defined in the runbook definition. At 308, if the runbook operator detects a trigger event, the process proceeds to 310. Alternatively, if the runbook operator does not detect a trigger event, the process loops, such that the runbook operator continues to monitor for trigger events as described herein. As described above, in some examples, the detected trigger events include scheduled trigger events, metric-based trigger events, alert-based trigger events, and/or combined trigger events. Alternatively, more, fewer, or different types of trigger events may also be used in the runbook definition and detected by the runbook operator without departing from the description herein.

At 310, the runbook operator performs a runbook operation of the runbook definition that is associated with the detected trigger event. The runbook operator performs the runbook operation via the runbook sidecar container. For instance, the runbook operator may send instructions to the runbook sidecar container and the runbook sidecar container performs the instructions from within the application host upon receipt. In some examples, the runbook operations performed include filesystem manipulation operations, data backup operations, data restore operations, cache clearing operations, operations for ending the application, application update operations, application configuration operations, operations for scaling up replicas of the application, operations for scaling down replicas of the application, and/or application state saving operations. Alternatively, more, fewer, or different operations may also be performed by the runbook operator in response to detected trigger events without departing from the description herein.

Figure 4:
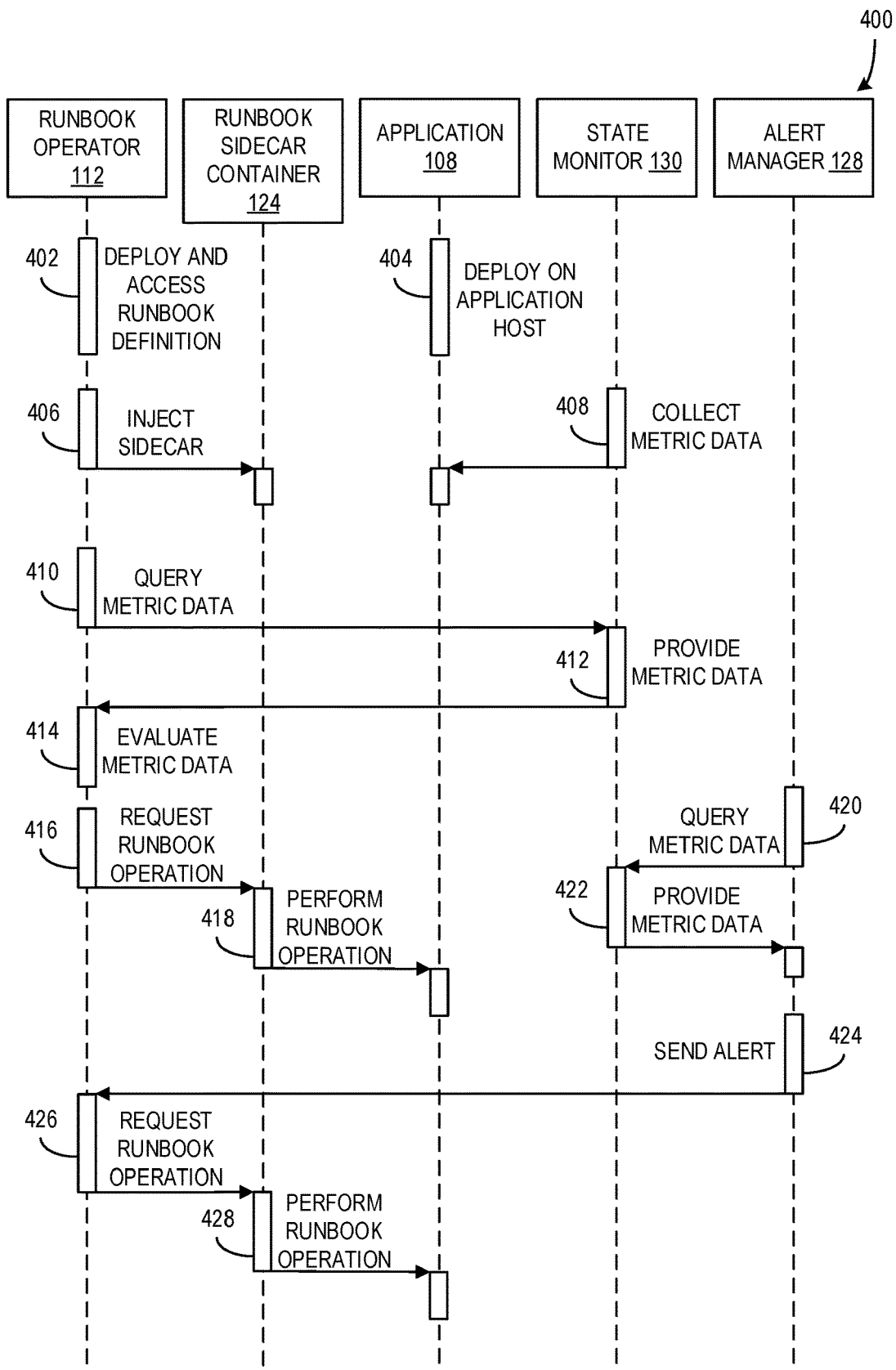
FIG. 4 is sequence diagram illustrating interactions between components of a system configured for automating runbook operations according to an embodiment.

FIG. 4 is sequence diagram 400 illustrating interactions between components of a system (e.g., system 100 of FIG. 1) configured for automating runbook operations according to an embodiment. At 402, the runbook operator 112 is deployed and accesses a runbook definition associated with the application 108. The runbook operator 112 may receive the runbook definition from a runbook definition platform or may otherwise access it from a data store configured for storing runbook definitions. At 404, the application 108 is deployed on an application host of the application platform upon which the runbook operator 112 is also deployed. While the illustration shows the deployment of the runbook operator 112 and the application 108 occurring during an overlapping time period, it should be understood that, in other examples, the deployment of these two components may occur at different times and/or in different orders without departing from the description herein.

At 406, the runbook operator 112 "injects" or otherwise deploys the runbook sidecar container 124 onto the application host upon which the application 108 is deployed. In some examples, the runbook operator 112 identifies the name or identifier of the application 108 in the accessed runbook definition, queries the application platform or a component thereof with the identified application name to determine which application host the application 108 is deployed on, and then communicates with that application host to deploy the runbook sidecar container 124 onto that same application host. In further examples, application 108 may be deployed on multiple application hosts (e.g., multiple instances of the application 108 may be running on the application platform). In that case, the runbook operator identifies all of the application hosts that are hosting the application 108 and injects instances of the runbook sidecar container 124 on all of the identified application hosts.

At 408, the state monitor 130 collects metric data from the application 108. In some examples, the collection of metric data by the state monitor 130 is done consistently throughout the operation of the application 108. Further, the state monitor 130 may collect metric data from other components of the system, such as from the application host that hosts the application 108 and/or from the application platform.

At 410, the runbook operator 112 queries metric data from the state monitor 130. In some examples, the runbook operator 112 queries for metric data from the state monitor 130 at a regular interval or intervals as defined by the configuration of the runbook operator 112 and/or the defined schedule of the runbook definition. The runbook operator 112 may request only a portion of the metric data collected by the state monitor 130, including the metric data values that are of use in evaluating the trigger events of the runbook definition. At 412, the state monitor 130 responds to the query by providing the requested metric data to the runbook operator 112 and, at 414, the runbook operator 112 evaluates the provided metric data via comparison to the trigger events in the runbook definition.

When the runbook operator 112 identifies a trigger event of the runbook definition based on evaluating the metric data at 414, the runbook operator 112 requests that a runbook operation associated with the identified trigger event be performed by the runbook sidecar container 124 at 416. In some examples, the request includes commands, script calls, API calls, or other code-based information that is to be executed by the runbook sidecar container 124 to perform the runbook operation. Alternatively, or additionally, the request includes a runbook operation name or identifier of the runbook operation to be performed.

At 418, upon receiving the request to perform the runbook operation, the runbook sidecar container 124 performs the requested runbook operation on or in association with the application 108. In examples where the request includes executable instructions or code, the runbook sidecar container 124 performs the executable instructions or code from a local perspective within the application host. Alternatively, or additionally, the runbook sidecar container 124 may include some or all of the executable instructions or code for the runbook definition and, upon receiving the request that includes a name or identifier of the runbook operation to be performed, the runbook sidecar container 124 identifies the included runbook operation to be performed based on the received name or identifier and performs that runbook operation.

At 420, the alert manager 128 queries for metric data from the state monitor 130. In some examples, some alerts that are issued by the alert manager 128 are based on metric data values that are collected by the state monitor 130, such that the alert manager 128 and the state monitor 130 communicate to share the relevant data values. At 422, the state monitor 130 provides the requested metric data to the alert manager 128. Upon receiving the provided metric data, the alert manager 128 determines that an alert should be sent at 424. In some examples, as described above, the runbook operator subscribes to or otherwise listens for alerts from the alert manager 128 that are of use in detecting trigger events of the runbook definition. At 426, the runbook operator 112 receives the sent alert from the alert manager 128 and requests the performance of a runbook operation for which the received alert is a trigger event. As described above with respect to 418, the runbook sidecar container 124 receives the request from the runbook operator 112 and performs the requested runbook operation on or with respect to the application 108 at 428.

It should be understood that, in alternative examples, the times at which the steps of method 400 are performed may differ without departing from the description herein. For instance, in some examples, the query for metric data from the alert manager 128 at 420 occurs at a regularly defined interval and does not always send alerts in response to the metric data, such that such query events occur repeatedly without triggering a runbook operation at 426-428. In another example, several runbook operations are triggered as a result of evaluating the metric data at 414, such that multiple requests to perform runbook operations are sent to the runbook sidecar container 124. In further examples, the runbook operator 112 detects trigger events and initiates runbook operations from a plurality of runbook definitions for a plurality of applications without departing from the description herein.

Figure 5:
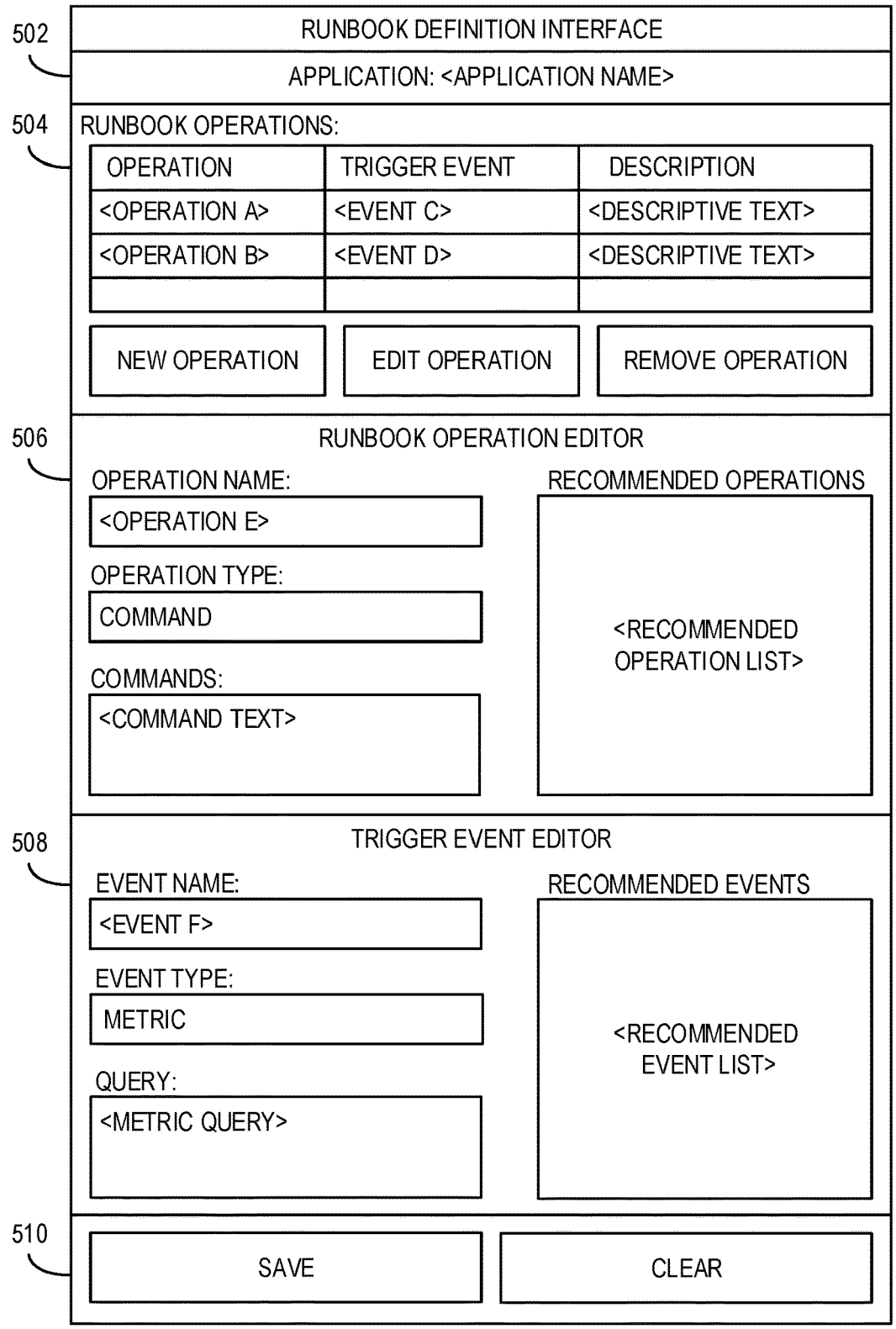
FIG. 5 is a block diagram illustrating a graphical user interface for generating runbook definitions according to an embodiment.

FIG. 5 is a block diagram illustrating a graphical user interface (GUI) 500 for generating runbook definitions according to an embodiment. In some examples, the GUI 500 is included in the user interface 234 of a runbook definition platform 232 as described above with respect to FIG. 2. The GUI 500 includes an application identification section 502, a runbook operation list section 504, a runbook operation editor section 506, a trigger event editor section 508, and an editor control button section 510. It should be understood that, in other examples, more, fewer or different sections of GUI 500 configured for enabling a user to provide runbook information and generate a runbook definition therefrom may be included without departing from the description herein.

The application identification section 502 includes the name of the application for which the runbook definition is to be generated. In other examples, the application identification section 502 is configured to include other information and/or metadata associated with the application, such as an application type, an application version, or the like. Further, the application identification section may include interface elements enabling the user to enter the application identifier or name and/or search for and select applications from a set of applications for which the user can generate runbook definitions.

The runbook operation list section 504 includes a table that lists the current runbook operations and associated trigger events in the runbook definition. Further, the section 504 includes a "new operation" button, an "edit operation" button, and a "remove operation" button. Each runbook operation that has been added to the list of section 504 (e.g., operations A and B) are associated with trigger events (e.g., trigger events C and D respectively) and the operations are further described in the description column of the table. The descriptive text may include information associated with the operation and/or the trigger event based on how the operation-trigger event pair is configured (e.g., the descriptive text may be entered by the user and/or automatically generated based on the operation type, event type, and/or any other data provided as described herein).

The "new operation" button is configured to initiate a runbook operation creation process that clears the fields in each of the editor sections 506 and 508, enabling the user to provide information to create a new operation. Further, based on activation of the "new operation" button, the recommended operations and/or recommended events sections of the sections 506 and 508 may be populated with recommended operations and recommended trigger events respectively for use in creating the new operation.

The "edit operation" button is configured to enable the user to edit an operation that has already been created and is present in the runbook operation list section 504. In some examples, when the "edit operation" button is activated, the user is prompted to select one of the operations in the runbook operation table. Alternatively, or additionally, if the use has already highlighted or otherwise selected an operation in the runbook operation table, activating the "edit operation" button enables the user to edit the selected operation. In order to edit the operation, the data associated with the selected operation is loaded into the fields of the editors 506 and 508 respectively.

The "remove operation" button is configured to enable the user to remove an operation from the runbook operation table. As with the edit operation button, the user may be prompted to select an operation to remove and/or an already selected operation may be removed upon activation of the remove operation button. Further, in some examples, the user is prompted to confirm that the user wants to remove the operation that is selected to prevent accidentally removing the wrong operation. Removing the operation from the runbook operation table results in the row of that operation being cleared and, upon eventual generation of the associated runbook definition, the removed operation is not included in the runbook definition.

The runbook operation editor section 506 includes a set of fields that enable the user to provide data for defining a runbook operation and a section for displaying recommended operations for use by the user. The fields include an operation name field, in which the user inputs the name of the runbook operation and an operation type field in which the user inputs the type of the runbook operation. As illustrated, the operation name field includes the name of operation E and the operation type is set to "command". The fields further include a commands section in which the user inputs the commands to be executed in order to perform the runbook operation. In some examples, the commands field is dynamically displayed based on the user selecting the command operation type in the operation type field and, when a different operation type is selected or entered, more or different fields may be displayed that are associated with that different operation type.

The recommended operation section of the runbook operation editor section 506 is configured to display recommended runbook operations (e.g., as generated by runbook recommendation engine 240 of FIG. 2). In some examples, the user is enabled to select the recommended runbook operations and view the data associated with the selected recommended runbook operations. For instance, selecting a recommended runbook operation may populated the data of that operation in the fields of the runbook operation editor 506. Alternatively, the data of the selected operation may be displayed in another manner, such as in a dialog box or the like. The user is further enabled to use some or all of the data of the selected operation in the runbook operation editor when creating or editing a runbook operation for inclusion in the runbook definition.

The trigger event editor section 508 includes a set of fields that enable the user to provide data for defining a trigger event associated with the runbook operation in the runbook operation editor section 506 and a section for displaying recommended trigger events for use by the user. The fields include an event name field, in which the user inputs the name of the trigger event and an event type field in which the user inputs the type of the event. As illustrated, the event name field includes the name of event F and the operation type is set to "metric". The fields further include a query section in which the user inputs the query to be evaluated to determine whether the trigger event has occurred. As with the runbook operation editor 506 above, in some examples, the query field is dynamically displayed based on the user selecting the metric event type in the event type field and, when a different event type is selected or entered, more or different fields may be displayed that are associated with that different event type.

The recommended events section of the trigger event editor section 508 is configured to display recommended trigger events (e.g., as generated by runbook recommendation engine 240 of FIG. 2). In some examples, the user is enabled to select the recommended trigger events and view the data associated with the selected recommended trigger events. For instance, the recommended events section may be configured to function in substantially the same manner as the recommended operations section of the runbook operation editor section 506 as described above. The user is further enabled to use some or all of the data of the selected trigger event in the trigger event editor when creating or editing a trigger event associated with the runbook operation in the runbook operation editor section 506 for inclusion in the runbook definition.

The editor control button section 510 includes a "save" button and a "clear" button configured for interacting with the editors 506 and 508. The save button is configured to enable the user to save the currently displayed runbook operation-trigger event pair to the runbook operation list section 504, such that the saved runbook operation-trigger event pair is included in the runbook definition upon generation. The clear button is configured to enable the user to clear the data in the fields of the editors 506 and 508. It should be understood that, in other examples, more, fewer, or different buttons or other interface components may be included for controlling the editor sections 506 and 508 without departing from the description herein.

Additional Example Scenarios

Aspects of the disclosure enable various additional scenarios, such as next described.

In an example, the runbook operator of an application platform accesses the following runbook definition:

```
metadata:
    name: cache-cleaner
spec:
    selector:
        matchLabels:
            app: cache
    schedule: "5 5 */1 * *"
    actions:
    - action:
        name: clear cache
        type: bash
        command: rm -f /var/cache/*
        on_failure:
            url: https://<network address>/send
            payload: "{error: \"{{action.stdout}}\"}"
        on_success:
            url: https://<network address>/send
```

The runbook definition includes a runbook operation for clearing the cache of an application called "cache". The trigger event is a scheduled event that is defined in "cron job" syntax as "5 5 */1 * *", which indicates that the runbook operation should be run at 5:05 on every day of the month. Based on this defined trigger event, the runbook operator schedules the runbook operation to be performed at that time each day.

The runbook operator identifies the application host of the application platform that is hosting the cache application and communicates with the identified application host to deploy a runbook sidecar container on the host such that the interface is in communication with the cache application from within the host.

When the scheduled time arrives, the runbook operator sends a request to the deployed runbook sidecar container that includes the command "rm -f /var/cache/*" from the runbook definition, as well as an indication that the operation is a "bash" operation, or a command line operation. The runbook sidecar container receives the request and performs the included command from within the application host, such that the cache associated with the cache application is cleared. The runbook operator continues to run and request the performance of the runbook operation at the scheduled time each day.

In another example, a user uses a runbook definition platform to input information about runbook operations for an application called "batch". The runbook definition platform generates the following runbook definition as described herein:

```
metadata:
    name: batch-monitor
spec:
    selector:
        matchLabels:
            app: batch
    triggers:
    - alert:
        name: BatchBacklogStalled
        source: Alert Manager
```
```
        action: reload batch processor
    - metric:
        name: cpu usage spiking
        source: State Monitor
        query: (cpu_usage{batch}[5m])) > 0.8
        action: create additional batch processor
    actions:
    - action:
        name: reload batch processor
        type: webhook
        url: http://batch-service/~/reload
        on_failure:
            url: https://<network address>/send
    - action:
        name: create additional batch processor
        type: kube
        verb: create
        manifestURL: https://<network address>/job.yaml
        on_failure:
            url: https://<network address>/send
```

The runbook operator of the application platform accesses the newly generated runbook definition, identifies the application host or hosts that are hosting instances of the batch applications, and deploys runbook sidecar containers on each of the identified application hosts as described herein.

The runbook definition includes an alert-based trigger event that is triggered when a "BatchBacklogStalled" alert is received from the alert manager and a metric-based trigger event that is triggered based on the query, (cpu_usage{batch}[5m]))>0.8, which is triggered when the CPU usage of the application host used for the batch application over the last 5 minutes exceeds 0.8 or 80%. The runbook operator begins to monitor the alerts from the alert manager to identify the "BatchBacklogStalled" alert and to periodically obtain CPU usage metric data from the state monitor of the application platform. The obtained CPU usage metric data is used to evaluate the query of the trigger event.

Later, when one or both of the trigger events in the runbook definition are detected by the runbook operator, the runbook operator requests the performance of the associated runbook operations by the deployed runbook operation instances. When the "BatchBacklogStalled" alert is detected, a webhook-based operation that reloads the batch processor is performed. Alternatively, or additionally, when the CPU usage metric data indicates that the usage by the batch application exceeds the defined 80% threshold, a KUBERNETES-based operation that creates an additional batch processor or application is performed as described herein.

Exemplary Operating Environment

Figure 6:
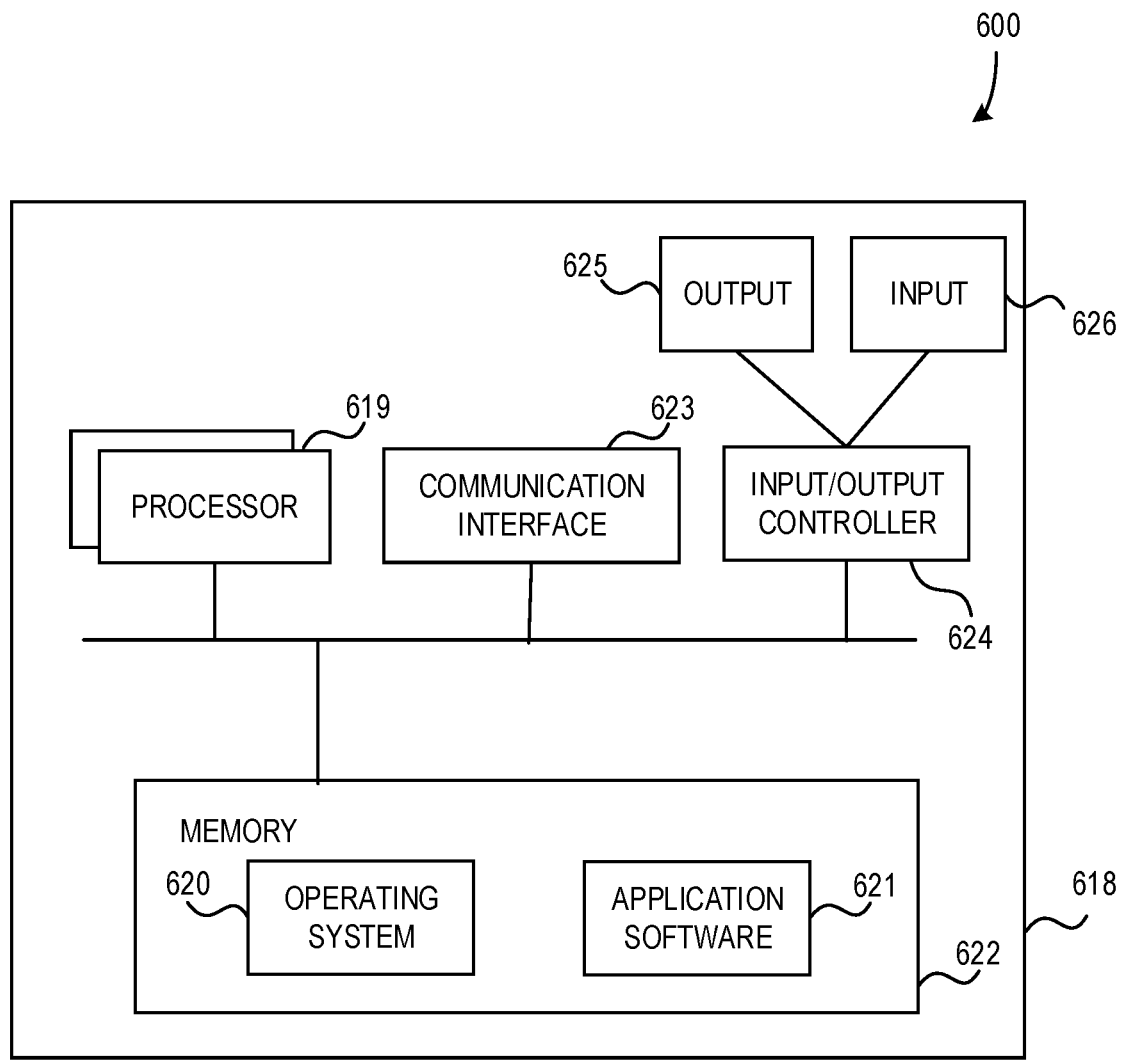
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, generating a runbook definition and automatically performing runbook operations for an associated application based on evaluation of the runbook definition as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: access a runbook definition associated with the application, the runbook definition including at least one trigger event and at least one runbook operation associated with the at least one trigger event; execute a runbook operator on the application platform based on the accessed runbook definition; add, by the runbook operator, a runbook sidecar container to the application host, wherein the runbook operator is enabled to perform the at least one runbook operation within the application host via the runbook sidecar container; and based on detecting a trigger event of the at least one trigger event, perform, by the runbook operator, via the runbook sidecar container, a runbook operation of the at least one runbook operation that is associated with the detected trigger event, whereby the application is maintained based on performance of the runbook operation.

A computerized method for automating runbook operations associated with an application within an application host on an application platform comprises: accessing, by a processor, a runbook definition associated with the application, the runbook definition including at least one trigger event and at least one runbook operation associated with the at least one trigger event; executing, by the processor, a runbook operator on the application platform based on the accessed runbook definition; adding, by the runbook operator, a runbook sidecar container to the application host, wherein the runbook operator is enabled to perform the at least one runbook operation within the application host via the runbook sidecar container; and based on detecting a trigger event of the at least one trigger event, performing, by the runbook operator, via the runbook sidecar container, a runbook operation of the at least one runbook operation that is associated with the detected trigger event, whereby the application is maintained based on performance of the runbook operation.

One or more non-transitory computer storage media having computer-executable instructions for automating runbook operations associated with an application within an application host on an application platform that, upon execution by a processor, cause the processor to at least: access, by the processor, a runbook definition associated with the application, the runbook definition including at least one trigger event and at least one runbook operation associated with the at least one trigger event; execute, by the processor, a runbook operator on the application platform based on the accessed runbook definition; add, by the runbook operator, a runbook sidecar container to the application host, wherein the runbook operator is enabled to perform the at least one runbook operation within the application host via the runbook sidecar container; and based on detecting a trigger event of the at least one trigger event, perform, by the runbook operator, via the runbook sidecar container, a runbook operation of the at least one runbook operation that is associated with the detected trigger event, whereby the application is maintained based on performance of the runbook operation.

Alternatively, or in addition to the other examples described herein, examples include any combination of the following:

wherein the at least one runbook operation includes at least one of a filesystem manipulation operation, a data backup operation, a data restore operation, a cache clearing operation, an operation for ending the application, an update operation, a configuration operation, an operation for scaling up replicas of the application, an operation for scaling down replicas of the application, or an application state saving operation.

wherein the at least one trigger event includes a scheduled event and wherein detecting the trigger event includes detecting an expiration of a time period associated with the scheduled event.

wherein the at least one trigger event includes an alert event and wherein detecting the trigger event includes receiving an alert indicator associated with the alert event from an alert manager associated with the application platform.

wherein the at least one trigger event includes a metric threshold event and wherein detecting the trigger event includes detecting that a metric value associated with the application is outside of a threshold range associated with the metric threshold event.

further comprising: receiving, via a user interface, user input including trigger event definition data and associated runbook operation definition data; and generating the runbook definition based on formatting the received user input according to a defined runbook definition format.

further comprising: identifying at least one event associated with the application based on at least one of runbook pattern data associated with at least one other runbook definition or application-specific data associated with the application; providing the identified at least one event via the user interface as a recommended trigger event for the runbook definition; determining at least one potential runbook operation based on at least one runbook operation pattern associated with a set of established runbook definitions; and providing the at least one potential runbook operation via the user interface as a recommended runbook operation for the runbook definition; wherein receiving user input includes receiving selection data indicating user selection of at least one of the recommended trigger event or the recommended runbook operation; and wherein generating the runbook definition is further based on the received selection data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for accessing, by a processor, a runbook definition associated with the application, the runbook definition including at least one trigger event and at least one runbook operation associated with the at least one trigger event; exemplary means for executing, by the processor, a runbook operator on the application platform based on the accessed runbook definition; exemplary means for adding, by the runbook operator, a runbook sidecar container to the application host, wherein the runbook operator is enabled to perform the at least one runbook operation within the application host via the runbook sidecar container; and, based on detecting a trigger event of the at least one trigger event, exemplary means for performing, by the runbook operator, via the runbook sidecar container, a runbook operation of the at least one runbook operation that is associated with the detected trigger event, whereby the application is maintained based on performance of the runbook operation.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for automatically performing runbook operations associated with an application within an application host on a container-based application platform, the system comprising:
   at least one processor; and
   at least one memory comprising computer program code, the at least one memory and the computer program code configured to, with the at least one processor, cause the at least one processor to:
      provide, via a runbook recommendation engine, recommended trigger events and recommended runbook operations based on runbook pattern data and application-specific data corresponding to the application;
      generate a runbook definition associated with the application based on the provided recommended trigger events and provided recommended runbook operations, the runbook definition including at least one trigger event of the provided recommended trigger events and at least one runbook operation associated with the at least one trigger event of the provided recommended runbook operations;
      execute a runbook operator on the application platform based on the generated runbook definition;
      add, by the runbook operator, a runbook sidecar container to the application host, wherein the runbook operator is enabled to perform the at least one runbook operation within the application host via the runbook sidecar container;
      select a runbook operation from the runbook definition based on at least one runbook operation pattern associated with a set of established runbook definitions, the at least one runbook operation pattern included in the runbook pattern data, wherein the at least one runbook operation pattern is based on one or more of frequently used trigger events, frequently used runbook operations, frequently used event-runbook operation pairs, and runbook operation sections, and wherein the one or more of the frequently used trigger events includes the at least one trigger event; and
      based on detecting the at least one trigger event of the one or more of the frequently used trigger events, perform, by the runbook operator, via the runbook sidecar container, the runbook operation of the at least one runbook operation that is associated with the detected at least one trigger event, whereby the application is maintained based on performance of the performed runbook operation.

2. The system of claim 1, wherein the at least one runbook operation includes at least one of a filesystem manipulation operation, a data backup operation, a data restore operation, a cache clearing operation, an operation for ending the application, an update operation, a configuration operation, an operation for scaling up replicas of the application, an operation for scaling down replicas of the application, or an application state saving operation.

3. The system of claim 1, wherein:
   the at least one trigger event includes a scheduled event, and
   detecting the at least one trigger event includes detecting an expiration of a time period associated with the scheduled event.

4. The system of claim 1, wherein:
   the at least one trigger event includes an alert event, wherein the alert event includes a hardware-based or kernel-based error or exception, and
   detecting the at least one trigger event includes:
      determining that an alert corresponding to the trigger event has been obtained at least by periodically polling an alert manager associated with the application platform, and
      receiving an alert indicator associated with the alert event from the alert manager in response to the periodic polling.

5. The system of claim 1, wherein:
   the at least one trigger event includes a metric threshold event, and
   detecting the at least one trigger event includes detecting that a metric performance value associated with a performance of the application is outside of a threshold range associated with the metric threshold event.

6. The system of claim 1, wherein the at least one memory and the computer program code are configured to, with the at least one processor, further cause the at least one processor to:

receive, via a user interface, user input including trigger event definition data and associated runbook operation definition data;

provide the recommended trigger events and the recommended runbook operations based at least in part on the received user input; and generate the runbook definition based on the provided recommended trigger events and the provided recommended runbook operations at least by formatting the received user input according to a defined runbook definition format.

7. The system of claim 6, wherein the at least one memory and the computer program code are configured to, with the at least one processor, further cause the at least one processor to:

identify at least one event associated with the application based on at least one of the at least one runbook operation pattern associated with at least one other runbook definition or application-specific data associated with the application;

provide the identified at least one event via the user interface as a recommended trigger event for the runbook definition;

determine the runbook operation based on the at least one runbook operation pattern associated with the set of established runbook definitions; and provide the runbook operation via the user interface as a recommended runbook operation for the runbook definition;

wherein receiving user input includes receiving selection data indicating user selection of at least one of the recommended trigger event or the recommended runbook operation; and wherein generating the runbook definition is further based on the received selection data.

8. The system of claim 1, wherein the container-based application platform is a KUBERNETES platform.

9. A computerized method for automating runbook operations associated with an application within an application host on a container-based application platform, the method comprising:

providing, via a runbook recommendation engine, recommended trigger events and recommended runbook operations based on runbook pattern data and application-specific data corresponding to the application;

generating, by a processor, a runbook definition associated with the application based on the provided recommended trigger events and provided recommended runbook operations, the runbook definition including at least one trigger event of the provided recommended trigger events and at least one runbook operation associated with the at least one trigger event of the provided recommended runbook operations;

executing, by the processor, a runbook operator on the application platform based on the generated runbook definition;

adding, by the runbook operator, a runbook sidecar container to the application host, wherein the runbook operator is enabled to perform the at least one runbook operation within the application host via the runbook sidecar container;

selecting a runbook operation from the runbook definition based on at least one runbook operation pattern associated with a set of established runbook definitions, the at least one runbook operation pattern included in the runbook pattern data, wherein the at least one runbook operation pattern is based on one or more of frequently used trigger events, frequently used runbook operations, frequently used event-runbook operation pairs, and runbook operation sections, and wherein the one or more of the frequently used trigger events includes the at least one trigger event; and based on detecting the at least one trigger event of the one or more of the frequently used trigger events, performing, by the runbook operator, via the runbook sidecar container, the runbook operation of the at least one runbook operation that is associated with the detected at least one trigger event, whereby the application is maintained based on performance of the performed runbook operation.

10. The computerized method of claim 9, wherein the at least one runbook operation includes at least one of a filesystem manipulation operation, a data backup operation, a data restore operation, a cache clearing operation, an operation for ending the application, an update operation, a configuration operation, an operation for scaling up replicas of the application, an operation for scaling down replicas of the application, or an application state saving operation.

11. The computerized method of claim 9, wherein:
the at least one trigger event includes a scheduled event, and
detecting the at least one trigger event includes detecting an expiration of a time period associated with the scheduled event.

12. The computerized method of claim 9, wherein:
the at least one trigger event includes an alert event, and
detecting the at least one trigger event includes:
periodically polling an alert manager associated with the application platform to determine if an alert corresponding to the alert event has been obtained, and
receiving an alert indicator associated with the alert event from the alert manager in response to the periodic polling.

13. The computerized method of claim 9, wherein:
the at least one trigger event includes a metric threshold event, and
detecting the at least one trigger event includes detecting that a metric value associated with a performance of the application is outside of a threshold range associated with the metric threshold event.

14. The computerized method of claim 9, further comprising:

receiving, via a user interface, user input including trigger event definition data and associated runbook operation definition data; and generating the runbook definition based on formatting the received user input according to a defined runbook definition format.

15. The computerized method of claim 14, further comprising:

identifying at least one event associated with the application based on at least one of the at least one runbook operation pattern associated with at least one other runbook definition or application-specific data associated with the application;

providing the identified at least one event via the user interface as a recommended trigger event for the runbook definition;

determining the runbook operation based on the at least one runbook operation pattern associated with the set of established runbook definitions; and providing the runbook operation via the user interface as a recommended runbook operation for the runbook definition;

wherein receiving user input includes receiving selection data indicating user selection of at least one of the recommended trigger event or the recommended runbook operation; and wherein generating the runbook definition is further based on the received selection data.

16. One or more non-transitory computer storage media having computer-executable instructions for automating runbook operations associated with an application within an application host on a container-based application platform that, upon execution by a processor, cause the processor to at least:

provide, via a runbook recommendation engine, recommended trigger events and recommended runbook operations based on runbook pattern data and application-specific data corresponding to the application;

generate, by the processor, a runbook definition associated with the application based on the provided recommended trigger events and provided recommended runbook operations, the runbook definition including at least one trigger event of the provided recommended trigger events and at least one runbook operation associated with the at least one trigger event of the provided recommended runbook operations;

execute, by the processor, a runbook operator on the application platform based on the generated runbook definition;

add, by the runbook operator, a runbook sidecar container to the application host, wherein the runbook operator is enabled to perform the at least one runbook operation within the application host via the runbook sidecar container;

select a runbook operation from the runbook definition based on at least one runbook operation pattern associated with a set of established runbook definitions, the at least one runbook operation pattern included in the runbook pattern data, wherein the at least one runbook operation pattern is based on one or more of frequently used trigger events, frequently used runbook operations, frequently used event-runbook operation pairs, and runbook operation sections, and wherein the one or more of the frequently used trigger events includes the at least one trigger event; and based on detecting the at least one trigger event of the one or more of the frequently used trigger events, perform, by the runbook operator, via the runbook sidecar container, the runbook operation of the at least one runbook operation that is associated with the detected at least one trigger event, whereby the application is maintained based on performance of the performed runbook operation.

17. The one or more non-transitory computer storage media of claim 16, wherein the at least one runbook operation includes at least one of a filesystem manipulation operation, a data backup operation, a data restore operation, a cache clearing operation, an operation for ending the application, an update operation, a configuration operation, an operation for scaling up replicas of the application, an operation for scaling down replicas of the application, or an application state saving operation.

18. The one or more non-transitory computer storage media of claim 16, wherein the at least one trigger event includes a scheduled event and wherein detecting the trigger event includes detecting an expiration of a time period associated with the scheduled event.

19. The one or more non-transitory computer storage media of claim 16, wherein the at least one trigger event includes an alert event and wherein detecting the trigger event includes receiving an alert indicator associated with the alert event from an alert manager associated with the application platform.

20. The one or more non-transitory computer storage media of claim 16, wherein the at least one trigger event includes a metric threshold event and wherein detecting the trigger event includes detecting that a metric value associated with the application is outside of a threshold range associated with the metric threshold event.

* * * * *